US010653110B2

(12) United States Patent
Pfeiff

(10) Patent No.: US 10,653,110 B2
(45) Date of Patent: May 19, 2020

(54) CONTROL UNIT FOR GAME OR FISH FEEDER

(71) Applicant: Nordic Gamekeeper AB, Slöinge (SE)

(72) Inventor: Carl Pfeiff, Slöinge (SE)

(73) Assignee: Nordic Gamekeeper AB, Slöinge (SE)

( * ) Notice: Subject to any disclaimer, the term of this patent is extended or adjusted under 35 U.S.C. 154(b) by 253 days.

(21) Appl. No.: 15/129,261

(22) PCT Filed: Mar. 25, 2015

(86) PCT No.: PCT/EP2015/056407
§ 371 (c)(1),
(2) Date: Sep. 26, 2016

(87) PCT Pub. No.: WO2015/144763
PCT Pub. Date: Oct. 1, 2015

(65) Prior Publication Data
US 2017/0105388 A1   Apr. 20, 2017

(30) Foreign Application Priority Data

Mar. 26, 2014   (EP) .................................. 14161816

(51) Int. Cl.
*A01K 5/02*   (2006.01)
*A01K 61/80*   (2017.01)
(Continued)

(52) U.S. Cl.
CPC .............. *A01K 5/0225* (2013.01); *A01K 5/02* (2013.01); *A01K 5/0291* (2013.01); *A01K 61/80* (2017.01);
(Continued)

(58) Field of Classification Search
CPC ........ A01K 5/001; A01K 5/02; A01K 5/0225; A01K 5/0275; A01K 5/0291
See application file for complete search history.

(56) References Cited

U.S. PATENT DOCUMENTS 5,605,249 A * 2/1997 Gonyea ................... G07F 11/54
221/11
5,749,316 A * 5/1998 Deagan .................... A01K 5/02
119/57.8
(Continued)

FOREIGN PATENT DOCUMENTS

WO   2012/001422 A1   1/2012

OTHER PUBLICATIONS

International Search Report and Written Opinion dated Jul. 21, 2015, issued in corresponding International Application No. PCT/EP2015/056407, filed Mar. 25, 2015, 13 pages.

*Primary Examiner* — Christopher D Hutchens
(74) *Attorney, Agent, or Firm* — Christensen O'Connor Johnson Kindness PLLC

(57) ABSTRACT

The present invention relates to a control unit (116) for a game or fish feeder (100). The control unit (116) is mounted on the feeder (100) and comprises: means (130) for controlling the powering of a drive unit (110) of said feeder (100) for controlled output of feed from the feeder (100); a wireless transmitter (138) arranged to communicate over a wireless network (146) with a remote unit (140); a sensor (132; 134) for measuring a parameter of the feeder (100); and means (124) for determining whether a measured parameter value provided by said sensor (132; 134) fulfills a predetermined condition in order to detect an action-requiring state of the feeder (100). In response to a detected action-requiring state, the wireless transmitter (138) is triggered to send a notification to said remote unit (140).

11 Claims, 4 Drawing Sheets

(51) Int. Cl.
*A01M 31/00* (2006.01)
*H02H 7/08* (2006.01)
*H02P 1/18* (2006.01)
*H04Q 9/00* (2006.01)

(52) U.S. Cl.
CPC ........ *A01M 31/002* (2013.01); *H02H 7/0822* (2013.01); *H02P 1/18* (2013.01); *H04Q 9/00* (2013.01); *H04Q 2209/40* (2013.01); *H04Q 2209/823* (2013.01); *Y02A 40/845* (2018.01)

(56) References Cited

U.S. PATENT DOCUMENTS

| | | | |
|---|---|---|---|
| 7,275,501 B1 | 10/2007 | Laceky | |
| 8,336,492 B1* | 12/2012 | Barley | A01K 5/00 119/51.04 |
| 2005/0066905 A1* | 3/2005 | Morosin | A01K 5/0291 119/51.02 |
| 2007/0008395 A1* | 1/2007 | Masubuchi | G03G 15/0131 347/104 |
| 2009/0020074 A1* | 1/2009 | Harman | A01K 5/02 119/51.11 |
| 2010/0095895 A1* | 4/2010 | Laliberta | A01K 5/0275 119/56.1 |
| 2011/0088625 A1* | 4/2011 | Nowacek | A01K 5/02 119/51.02 |
| 2012/0085288 A1* | 4/2012 | Salinas | A01K 5/0225 119/51.02 |
| 2013/0157648 A1* | 6/2013 | Boenker, IV | H04W 4/50 455/420 |
| 2013/0180456 A1* | 7/2013 | Whitsett | A01K 5/02 119/57.92 |
| 2013/0199450 A1 | 8/2013 | Harty, Sr. et al. | |
| 2018/0300662 A1* | 10/2018 | Lauve, IV | G06Q 10/06314 |

* cited by examiner

CONTROL UNIT FOR GAME OR FISH FEEDER

FIELD OF THE INVENTION

The present invention relates to game or fish feeders, and the controlling of outlet of feed from such feeders.

BACKGROUND OF THE INVENTION

Game feeders are used for dispersing feed in order to attract or retain animals, such as deer, wild boar or birds, at a specific location. Game feeders may be used by hunters to control game to a site where hunting is to be performed, but may also be used by farmers to divert the game away from crops. The game feeder may be controlled to distribute feed at certain times, such as in mornings and evenings, when the game is typically eating.

A game feeder may comprise a feed container and a motor for actuating a spreader, causing dispersal of feed from the feed container. The game feeder may further comprise a timer for controlling the motor such that the game feeder may be set up to disperse feed at specific times of day. The same type of structure may also be used for a fish feeder, by positioning the feeder by a waterfront so as to enable distributing fish feed into the water.

In U.S. Pat. No. 8,555,812, a game feeder configured for remote monitoring is disclosed. The game feeder comprises a computer comprising a wireless driver configured to communicatively couple the computer to a wireless communication network. The game feeder also comprises a remote monitoring system, which comprises an instrumentation suite including elements such as a rainfall sensor, barometer, thermometer, hydrometer, and camera. These sensors are selected to provide environmental data for the game feeder so that a user may through the wireless communication of the computer remotely be made aware of conditions at the hunting site.

The remote monitoring system is set up to avoid the need for a user to physically travel to the location of the game feeder in order to control it. In this regard, the remote monitoring system in U.S. Pat. No. 8,555,812 may also periodically transmit a communication with system information or statistics to a user. However, the information received from the remote monitoring system needs to be analyzed remotely in order for decisions to be taken on the controlling of the game feeder.

In US 2012/0085288, a game-animal feeding unit is disclosed, comprising a feed-dispersion mechanism in combination with a data acquisition unit and remote communication module. A volume sensor may detect that a volume of feed in a feed drum is low and a signal to a remote location may be wirelessly transmitted. Feed quantity, battery charge and/or other parameters can be transmitted on a schedule or can be interrogated from a remote station.

Hence, there is a need for an improved control of game feeders in order to facilitate for a user to easily ensure that the game feeder is working in a desired manner.

SUMMARY OF THE INVENTION

It is an object of the invention to provide improved control of game or fish feeders and to provide an improved feedback system on the operation of the game or fish feeder.

According to a first aspect of the invention, there is provided a control unit for a game or fish feeder, wherein the control unit is arranged for mounting on or in connection to the feeder, said control unit comprising: means for controlling the powering of a drive unit of said feeder for controlled output of feed from the feeder; a wireless transmitter arranged to communicate over a wireless network with a remote unit; a sensor for measuring a parameter of the feeder; and means for determining whether a measured parameter value provided by said sensor fulfills a predetermined condition in order to detect an action-requiring state of the feeder, wherein, in response to a detected action-requiring state, the wireless transmitter is triggered to send a notification to said remote unit.

The control unit may be defined in another way as a control unit for a game or fish feeder, wherein the control unit is arranged for mounting on or in connection to the feeder, said control unit comprising: a processing unit, which is configured for controlling the powering of a drive unit of said feeder for controlled output of feed from the feeder; a wireless transmitter arranged to communicate over a wireless network with a remote unit; a sensor for measuring a parameter of the feeder; and the processing unit being further configured to determine whether a measured parameter value provided by said sensor fulfills a predetermined condition in order to detect an action-requiring state of the feeder, wherein, in response to a detected action-requiring state, the wireless transmitter is triggered to send a notification to said remote unit.

According to a second aspect of the invention, there is provided a game or fish feeder system comprising: a feed container provided with a feed outlet; a spreader arranged to receive and spread feed from said feed outlet when said spreader is actuated; a drive unit connected to the spreader and arranged to actuate the spreader when the drive unit is powered; a battery arranged to power said drive unit; and a control unit according to the first aspect mounted on the feeder system.

Thanks to the invention, the control unit for a game or fish feeder may provide specific notifications regarding action-requiring states of the feeder. In particular, the control unit is able to send the notification as an immediate response to detecting that there is a problem at the feeder requiring attention. Also, the notification provides direct information to a user at a remote unit such that no further analysis of the information sent from the control unit is needed in order to determine that an action is required.

The control unit may for instance detect that an operational disturbance has occurred or is about to occur and may send a notification of such to a user at the remote unit. The user may thus be specifically notified when an operational disturbance occurs at the game feeder. This makes remote operational control easy for the user and also allows the user to only travel to the site of the game or fish feeder when necessary.

As used herein, the feature that the control unit "is arranged to be mounted on or in connection to the feeder" should be construed as the control unit being arranged in the vicinity of the feeder. The control unit may advantageously be mounted on any part of the feeder, such as on the feed container or on a stand on which the feed container is arranged. However, for the purpose of the invention, the control unit needs not necessarily be mounted on the feeder. For instance, the feeder may be situated close to another structure on which the control unit may be mounted.

According to a specific embodiment, the control unit is formed as a self-contained box, and the control unit comprises an input for connection to a battery, and an output for connection to the drive unit of the feeder such that the control unit controllably provides power from the battery to the drive unit.

This implies that the control unit may be provided as a single, separate unit that may control the powering of the drive unit of the feeder. Hence, the control unit may be simple to install on the feeder. In particular, the control unit may be easily installed on feeders that are already in use. Therefore, the control unit may be used to upgrade or improve a feeder that is in active use.

Thanks to the control unit providing a self-contained box having an input for connection to a battery and an output for connection to the drive unit, the control unit may be compatible with most automatic feeders. The installation may only require the connection of the control unit between a present battery and drive unit or the replacement of a present timer. Thus, an improved control of the feeder and improved feedback on the operation may be available without requiring any substantial installation work on the feeder.

By the control unit being formed as a self-contained box, a sensor for measuring a parameter of the feeder is placed within the self-contained box. This implies that there may be no need to separately mount or install the sensor on the feeder.

The sensor may comprise a power sensor for measuring the power consumption of the drive unit. In such case, the predetermined condition may be a deviation from a predetermined power consumption. This implies that the sensor is able to detect deviations in the powering of the drive unit. A deviation of the power consumption may indicate an operational disturbance. For instance, if a spreader being actuated by the drive unit is jammed or not running as smoothly as desired, the drive unit may need more power to actuate the spreader. Hence, such a disturbance may be discovered by detecting an increase in the power consumption of the drive unit. Likewise, the power consumption may be altered if the feeder is empty or if feed is jammed in an output opening of the feeder so that no feed is dispersed by the spreader (lowering the power consumption for actuating the spreader).

Thanks to the power sensor being installed in the control unit, it is possible to detect problems of the drive unit without having a sensor mounted on the drive unit. Hence, operational disturbances of the feeder, such as no feed being dispersed, may be detected without having to install a separate sensor on the feeder. Rather, the entire control unit and sensor system may be formed as a self-contained box.

As used herein, the term "power sensor" should be construed as any sensor detecting the power consumption. This may be achieved in a number of different ways, detecting different properties of a circuit powering a drive unit. For instance, the power sensor may detect voltage, current, electric power, resistance, or other parameters of the circuit as measures of the power consumption. The power sensor may e.g. be configured as a Hall sensor that measures the current for powering the drive unit by detecting a magnetic field created by the current.

According to an embodiment, the deviation from the predetermined power consumption may be set in relation to a normal power consumption that occurs when the feeder is functioning properly. The deviation may vary between different models of drive units and feeders and the deviation may therefore be set according to the specific conditions of the feeder on which the control unit is mounted. However, a default deviation may alternatively be used so that no adaptation to the specific feeder on which the control unit is mounted will be needed. Typically, the deviation from the predetermined power consumption may be set to be larger than 30% or lower than 40% of the predetermined power consumption.

According to an embodiment, the wireless transmitter is part of a wireless transceiver for receiving and transmitting information over a wireless network. This implies that the control unit may also receive information, which would enable a user at a remote unit to send instructions to the control unit for remotely controlling the functionality of the control unit.

According to an embodiment, the control unit is arranged to cause said wireless transmitter to periodically communicate with a central control system and receive information for updating scheduling data for controlling output of feed from the feeder. Hence, the control unit may be arranged to periodically communicate with a central control system, regardless whether any action-requiring state is detected. This allows the control unit to provide information of a state of the feeder to the central control system and receive updated scheduling data in response from the central control system. Also, if a user wants to change the schedule of output of feed from the feeder, this may be achieved by the control unit periodically making contact with a central control system and receiving updates to scheduling data.

According to an embodiment, the control unit may further comprise a motor-protective circuit breaker for cutting power to the drive unit in order to prevent excessive load on the drive unit. Hence, the control unit may prevent the drive unit to be excerted to an excessive load. This implies that the control unit may protect the drive unit from being damaged by excessive loads.

According to an embodiment, the feeder may further be provided with a lamp for illuminating a site of the feeder and the control unit may further be arranged to control turning on and off of the lamp. The illumination of the site of the feeder may for instance be started in relation to output of feed from the feeder and the site may be illuminated during a time period after feed has been output. Thus, the illumination of the site may act as a signal to animals that feed has been output and animals may learn to associate an illuminated site with the possibility to find feed at the site.

According to a third aspect of the invention, there is provided a method for detecting an action-requiring state of a game or fish feeder, wherein the feeder has a control unit mounted on or in connection to the feeder, said method comprising, by the control unit: controlling the powering of a drive unit of said feeder for controlled output of feed from the feeder; measuring a power consumption of said drive unit; determining whether a value of the measured power consumption fulfils a predetermined condition in order to detect an action-requiring state of the feeder; and in response to a detected action-requiring state, sending a notification to a remote unit.

According to the method, a control unit both controls the powering of a drive unit of a feeder and determines whether the powering of the drive unit functions properly. A user may thus be provided with a notification from the control unit when an action-requiring state of the feeder is detected. The user at a remote unit will therefore not need to perform further analysis of the information sent from the control unit in order to determine that an action is required. In particular, the method allows detection of any jamming of a spreader of the feeder or that a feed container is empty so the spreader is running without any load from feed.

The control unit may communicate with a remote unit via a central control system. The central control system may thus facilitate a user's control of the dispersal of feed actuated by the control unit and may provide direct instructions to the control unit based on a set-up by the user.

According to a fourth aspect of the invention, there is provided a central control system, wherein the central control system comprises: a set of rules for controlling feed dispersal, which is to be actuated by a game or fish feeder system; a communication module for communicating with a plurality of control units, each being associated with a game or fish feeder system; an interface for receiving and storing input from a user, said input comprising control unit specific parameters relating to feed dispersal and being associated with an identifier of the control unit identifying a specific control unit; wherein the communication module is further arranged to receive input from at least said specific control unit of the plurality of control units, said input comprising information of performed feed dispersals and being associated with the identifier of the control unit; and wherein the central control system further comprises a feed dispersal computing module, which is arranged to access the set of rules for controlling feed dispersal and the control unit specific parameters, and which is arranged to receive said input comprising information of performed feed dispersals, wherein the feed dispersal computing module is configured to determine feed dispersal instructions based on the received input and the set of rules for controlling feed dispersal and the control unit specific parameters, and wherein the communication module is further arranged to transmit the determined feed dispersal instructions to said specific control unit.

The central control system may thus provide a set of rules for controlling feed dispersal. This set of rules may constitute pre-set definitions of how feed dispersal may typically be scheduled. A user may thus be able to program the schedule to be used by a control unit in relation to the set of rules already provided by the central control system. Hence, the user may only need to input parameters that may adapt a pre-set definition to the specific schedule that the user desires. This facilitates a user's set-up of a control unit and also may facilitate making changes to the schedule after set-up. The schedule being set up for the control unit may also define time periods at which illumination should be provided by a lamp at a site of the feeder system.

Further, a control unit may be arranged to periodically connect to the central control system. For instance, the control unit may connect to the central control system in each interval between subsequent planned dispersals of feed. The central control system may thus check the input from the control unit regarding performed feed dispersals and determine whether a schedule for feed dispersal used by the control unit needs to be updated or temporarily changed. If an update or change is needed, the central control system may thus transmit updated feed dispersal instructions to the control unit.

According to an embodiment, the feeder system may further comprise a sensor for detecting a presence of an animal at a site of the feeder system. The input received by the central control system from the specific control unit may further comprise information whether animals have been detected at the site of the feeder system during a preceding period of time. The feed dispersal computing module may determine feed dispersal instructions based also on the information regarding detection of animals.

This may e.g. allow the feed dispersal computing module to determine instructions not to disperse feed if no animal has visited the site of the feeder system during a preceding period of time. Hence, feed dispersal may be made dependent on whether there are animals visiting the feeder site. Thus, unnecessary dispersal of feed may be avoided to save feed. Also, the timing of the feed dispersal may be maintained, even though it is made dependent of the presence of animals. Hence, the feeder system may not directly disperse feed when an animal is detected. Rather, the dispersal of feed may be performed according to a set schedule, but each of the dispersal occasions may be made dependent on whether animals are visiting the site.

According to an embodiment, the means for controlling the powering of the drive unit may induce one or more short current pulses to the drive unit for causing an output of a small amount of feed from the feeder system when no animal has visited the site of the feeder system during a preceding period of time. This may imply that at least some feed is provided on the ground at the site of the feeder and, in particular, close to the sensor for detecting a presence of an animal. Thus, if animals are coming to the site of the feeder, they may still be tempted to approach the sensor for detecting the presence such that the sensor is activated.

According to an embodiment, the central control system may further receive information regarding a location of the specific control unit and may have access to sunrise and sunset times for the location; wherein at least one rule in the set of rules may be related to the sunrise and sunset times; and wherein the feed dispersal computing module is further configured to determine feed dispersal instructions based on the sunrise and sunset times for the location of the specific control unit.

This implies that the feed dispersal may be related to the actual times when sun rises or sets. For instance, a user may define control unit specific parameters in relation to the sunrise and sunset times, such that feed dispersal may always be actuated 30 minutes before sunrise and 30 minutes after sunset. A schedule for illumination provided by the lamp of the feeder system may also be set in relation to the sunrise and sunset times and may further be correlated to the set times for feed dispersal.

The location of the specific control unit may be obtained by the control unit comprising a positioning sensor, such as a Global Positioning System (GPS) sensor, and the control unit transmitting a reading from the positioning sensor to the central control system. Alternatively, the location may be input through the interface for receiving input from a user, e.g. by the user marking the location of the feeder system (and the control unit) on a map.

The central control system may access a database comprising information of sunrise and sunset times in order to obtain the sunrise and sunset times for the location. The database may be internally stored in the central control system or may be external to the central control system. Even if the database is external to the central control system, the central control system may store the sunrise and sunset times for the specific location internally in order to allow quick access to such information.

The relation of the feed dispersal to sunrise and sunset times may be generally applicable and need not necessarily be combined with other features. According to a separate aspect, there is therefore provided a central control system, wherein the central control system comprises: a set of rules for controlling feed dispersal, which is to be actuated by a game or fish feeder system; a communication module for communicating with a control unit being associated with a game or fish feeder system; an astronomy module for retrieving sunrise and sunset times for a location at which the game or fish feeder system is positioned; an interface for receiving and storing input from a user, said input comprising control unit specific parameters relating to feed dispersal and being associated with an identifier of the control unit; and a feed dispersal computing module, which is arranged to access the set of rules for controlling feed dispersal, the sunrise and sunset times for the location and the control unit specific parameters, wherein the feed dispersal computing module is configured to determine feed dispersal instructions based on the set of rules for controlling feed dispersal, the sunrise and sunset times for the location and the control unit specific parameters, and wherein the communication module is further arranged to transmit the determined feed dispersal instructions to the control unit.

Thanks to the sunrise and sunset times being retrieved in relation to the location, the actual times when the sun rises and sets may be used in the control of the feed dispersal. This provides a substantial advantage in relation to feed dispersal being based on lighting conditions at the feeder system, since the lighting conditions may vary substantially on the weather conditions and therefore the feed dispersal may not in practice be performed at the sunset or sunrise.

A schedule for illumination provided by a lamp of the feeder system may also be set in relation to the sunrise and sunset times and may further be correlated to the set times for feed dispersal.

According to an embodiment, the communication module is further arranged to receive a notification regarding a detected action-acquiring state from a control unit, wherein the central control system is further arranged to send a message to the remote unit regarding the detected action-acquiring state.

The remote unit may run an application that is adapted for communicating with the central control system. In its simplest form, the application may be a web browser, that directs a user to web pages forming an interface to the central control system. The user may provide profile information through the application, such that the central control system has contact addresses to the remote unit. Alternatively, the central control system may communicate directly with the application that is run on the remote unit, sending the message to the application.

In one embodiment, the central control system may send a push notification to a device running the application in order to provide the message regarding the detected action-acquiring state. Alternatively, the central control system may send an e-mail to an e-mail address of the user or a short message services (SMS) message to a mobile phone of the user.

According to an embodiment, said input comprising control unit specific parameters relating to feed dispersal may comprise one or more of:
parameters relating scheduling times of the feed dispersal to times defined by the rules; parameters relating to the amount of feed to be dispersed; and
parameters relating to activation/deactivation of functionalities defined by the rules. For instance, the input may activate or deactivate an astronomy functionality that relates feed dispersal to sunrise and sunset times at the location, and may activate or deactivate a presence functionality that relates feed dispersal to detection of presence of animals at the site of the feeder system. In one embodiment, the astronomy functionality is activated and parameters are input for relating the feed dispersal time to the sunrise and sunset, such that the feed dispersal instructions may control feed dispersal to occur 30 minutes before sunrise and 30 minutes after sunset.

According to an embodiment, the input comprising information of performed feed dispersals may comprise one or more of: information of duration of activation of a drive unit for feed dispersal, information of power consumption during feed dispersal, and information of times at which feed dispersal have been performed. Using the information of performed feed dispersals, the central control system may keep track of the amount of feed being output by the feeder system. Hence, the central control system may determine whether the feed in the feed container is about to run out and may provide a corresponding indication to a remote unit.

Also, the feed dispersal computing module may use the information of performed feed dispersals together with information whether animals have been detected at the site of the feeder system in order to determine whether an upcoming, scheduled feed dispersal is to be performed. For instance, the rules for controlling feed dispersal may define that no feed dispersal is to be made if no animal has been detected at the site of the feeder system during a preceding period of time. However, if several sequential feed dispersals are skipped due to no animals being present at the site of the feeder system, the feed dispersal computing module may use the information of performed feed dispersals to ensure that a time between two sequential feed dispersals does not exceed a threshold. The feed dispersal computing module may thus determine that feed is to be dispersed, even though no animal has been detected to be present at the site of the feeder system.

The feeder system may be provided with a sensor for controlling whether feed is to be dispersed in relation to presence of animals at the feeder site. Such a sensor may or may not be used in combination with a control unit at the feeder.

Hence, according to a separate aspect, there is provided a game or fish feeder system, comprising: a feed container provided with a feed outlet; a spreader arranged to receive and spread feed from said feed outlet when said spreader is actuated; a detector for detecting an external force that may be assigned to a presence of an animal, the detector comprising: a movable actuator, which is mounted such that at least a part of the feed being output from the spreader is output in close vicinity of the movable actuator; wherein the movable actuator is biased towards a block position preventing access to the part of the feed and is movable from the block position by an external force being exerted on the movable actuator; and a sensor, which is arranged to detect when the movable actuator is moved from preventing access to the part of the feed.

Thanks to a feeder system comprising a movable actuator being arranged such that at least part of the feed is output close to the movable actuator and the actuator further prevents access to the part of the feed, the feeder system may be arranged to detect presence of animals at the site of the feeder system. In particular, an animal may smell and/or see the presence of feed at the movable actuator and may be tempted to nudge the movable actuator trying to access the feed. Thus, the movable acutator may be moved allowing the sensor to detect that an animal has visited the site of the feeder.

According to an embodiment, the detector for detecting an external force is mounted below the spreader. A small part of the feed may fall from the spreader during output of feed, which implies that part of the feed will be output close to the movable actuator. For instance, if the spreader comprises a rotatable disc for flinging out feed, part of the feed may still fall off the disc and end up below the spreader.

According to an embodiment, the movable actuator comprises a blocker, which is arranged to be mounted close to the ground in the block position of the movable actuator. The blocker may have relatively large dimensions parallel to the ground, such that it may prevent an animal to access feed on the ground below the blocker. There may be one or more holes or openings in the blocker such that feed falling onto the blocker may fall through the holes or openings so as to end up on the ground below the blocker.

The arrangement of a blocker close to the ground may effectively prevent animals from getting access to feed below the blocker. Thus, an animal will nudge or push the movable actuator to move the blocker so that the animal may get access to the feed. Thus, the animal may create a movement of the movable actuator that may be detected by the sensor in order to detect the presence of the animal.

According to an embodiment, the movable actuator may comprise a rod, which is jointedly connected to a structure of the feeder system and extends towards the ground from the jointed connection. The blocker may be attached to the rod. The rod may further be biased by at least one spring to the block position of the jointed connection. The spring may thus bias the movable actuator to the block position and may also dampen external forces to ensure that strong pushes by an animal does not damage the detector.

The movable actuator and the sensor allows for a simple construction for detecting the presence of an animal. The sensor may be a simple detector for registering that the actuator is moved. In this regard, the sensor may e.g. detect that the rod affects an electromagnetic or a vibrational wave, such as detecting that the rod blocks or reflects the wave. For instance, the sensor may detect that the rod blocks emitted light from reaching a photodiode, or the sensor may detect that a frequency of a reflected ultrasonic wave is shifted due to movement of the rod. Alternatively, a capacitive or inductive sensor may be used, wherein the sensor may be arranged to detect proximity of the rod in the block position by the rod providing a capacitive or inductive coupling to the sensor. The sensor may thus detect presence of an animal by the rod being moved away from proximity of the sensor. As a further alternative, the rod may make contact with a mechanical switch such that an electrical circuit is opened or closed when the rod is moved.

According to another embodiment, the detector for detecting an external force may comprise a residue compartment, which is arranged in relation to the spreader such that a part of the feed being spread by the spreader will be provided into the residue compartment; the residue compartment comprising an output opening and a movable plug, which is arranged to block the output opening and which may be moved from blocking the output opening by an external force; and a plug sensor for detecting when the plug is moved. Thus, when an animal exerts an external force of the residue compartment, the plug may be moved from the output opening and a small amount of feed may be released through the output opening of the residue compartment, giving the animal an incentive to nudge the residue compartment. Hence, the arrangement of a plug in a residue compartment will learn an animal to nudge the compartment in order to get access to more feed, while the animal does not get access to a large amount of feed since it is only residues from earlier performed feed dispersals that may accessed through the output opening of the residue compartment.

The detector for detecting an external force may be connected to the control unit according to the first aspect of the invention. Upon the sensor detecting that the movable actuator is moved, the sensor may thus provide an input signal to the control unit indicating that an animal is present at the site of the feeder.

BRIEF DESCRIPTION OF THE DRAWINGS

These and other aspects of the present invention will now be described in more detail, with reference to the appended drawings showing embodiment(s) of the invention.

DETAILED DESCRIPTION

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person.

Figure 1:
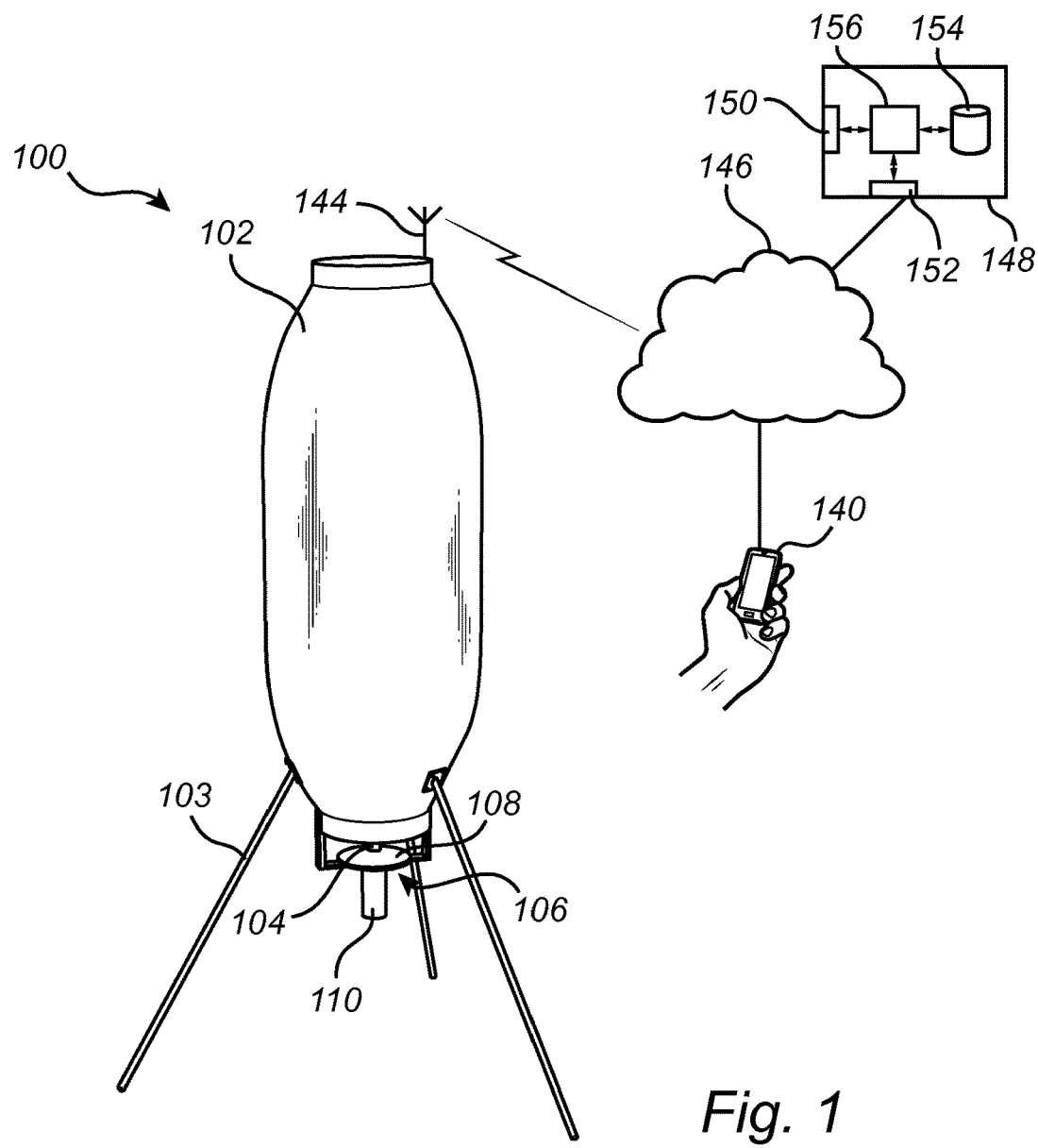
FIG. 1 is a schematic view of a feeder system according to an embodiment of the invention.

As schematically shown in FIG. 1, a game or fish feeder system 100 may comprise a feed container 102, which may store feed to be dispersed from the system 100. The feed container 102 may be refillable or replacable with a filled container 102, such that new feed may be provided when the system 100 is running out of feed. The feed container 102 may be arranged on a stand 103, which may allow the feed container 102 to be placed above ground. This may prevent game from trying to get access to feed directly from the feed container 102. Further, the feed may be let out from the feed container 102 by means of falling out through an outlet 104 in the bottom of the feed container 102.

The stand 103 may comprise three or more legs that extend in different directions from the feed container 102, so as to form a steady construction that will not fall due to wind or animals bumping into the stand 103. The stand 103 may further comprise crossbars between the legs so as to further reinforce the construction. The feed container 102 may be attached to the legs by means of the legs being connected to an attachment plate, which may be fixed, e.g. by screws, to the feed container 102. In one embodiment, the stand 103 may consist of three or more separate legs, that are each separately attached to the feed container 102.

The feed container 102 may be formed inside a weatherproof case, which may also cover other parts of the feeder system 100 to protect such parts from wear and tear due to weather conditions. Alternatively, a weatherproof case is arranged separately to the feed container 102 and may be mounted beneath the feed container 102. The stand 103 may be attached to the weatherproof case, while the weatherproof case is formed so as to allow a feed container 102 to be releasably mounted thereon. This facilitates replacing an empty feed container 102 with a filled feed container 102 when the feeder system 100 runs out of feed.

Figure 2:
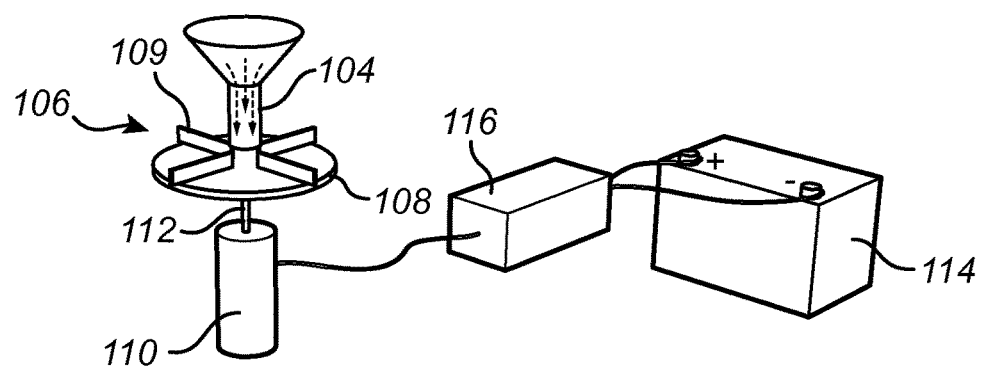
FIG. 2 is a schematic view of the driving of a spreader in the feeder system of FIG. 1.

As schematically shown in FIG. 2, the feed container 102 may be provided with a feed outlet 104 at the bottom of the feed container 102. The feed outlet 104 may be provided with a lid or stop (not shown) which may selectively be arranged in front of the outlet 104 so as to prevent feed from passing through the outlet 104. The system 100 may be arranged to actuate the lid so that it is displaced to and from a position blocking the outlet 104, depending on whether feed is desired to be dispersed or not. The system 100 may further comprise a spreader 106, which is arranged to receive and spread feed from the feed outlet 104. Hence, the feed passing through the outlet 104 may by means of the spreader 106 be dispersed in an area around the feeder system 100. The spreader 106 may be selectively actuated so as to control when feed is to be dispersed from the system 100.

In one embodiment, the spreader 106 is formed as a rotatable disc 108, which may be arranged beneath the feed outlet 104 so that feed falls from the feed container 102 onto the disc 108. When the disc 108 is actuated so as to start rotating, the feed on the disc 108 will be flung out from the feeder. By feed being flung out by the spreader 106, more feed is allowed to fall onto the rotatable disc 108 through the feed outlet 104 of the feed container 102. The speed of the rotatable disc 108 may be controlled in order to control how far away from the feeder system 100 the feed will be dispersed. Also, the feeder system 100 may be provided with a wall or stop (not shown) around a portion of the circumference of the rotatable disc 108 in order to control in which direction from the feeder system 100 the feed is dispersed. This may be particularly advantageous for use in a fish feeder, since the feeder system 100 may be arranged by the waterfront with a need to directing the feed into the water.

The feeder system 100 may further comprise a drive unit 110, which is connected to the spreader 106 and arranged to actuate the spreader 106. According to one embodiment, the drive unit 110 may comprise an electric motor, which is connected to a shaft 112 for rotating the shaft 112. The rotatable disc 108 of the spreader 106 may be attached to the shaft 112, such that when the shaft is rotated by the motor the rotatable disc 108 will also be rotated. The rotatable disc 108 may be provided with one or more baffles 109, extending from a central portion of the disc 108 towards the outer portion of the disc 108. The baffles 109 may even extend beyond the outer rim of the disc 108. The baffles 109 will, during rotation of the rotatable disc 108, guide feed from the central portion of the disc 108 towards the outer rim of the disc 108 so as to facilitate the spreading of feed by the spreader 106.

The drive unit 110 may be connected to a battery 114 via a control unit 116 in order to power the drive unit 110. The control unit 116 may thus function as a timer for controlling when the drive unit 110 is powered. Hence, by means of the control unit 116 the time of dispersing feed from the feeder system 100 may be controlled.

The drive unit 110 may be any type of unit that converts the electric energy provided by the battery 114 to mechanical or other type of energy for providing a spreading action so as to disperse feed. A skilled person realizes that the spreader 106 and the drive unit 110 may be formed in a number of different ways for achieving dispersal of feed. For example, the spreader 106 need not be arranged below the feed container 102. Rather, the drive unit 110 may drive a screw for lifting feed from the feed container 102 and flinging feed out of the feeder system 100. Also, other types of spreading actions may be contemplated, e.g. using pressurized air to spread feed from the feeder system 100.

The control unit 116 may preferably be mounted in a weatherproof case of the feeder system 100. The control unit 116 may then be mounted inside a hatch or door in the case, providing easy access to the control unit 116. However, the control unit 116 may in itself be formed as a weatherproof box, which may be mounted on the stand 103 or on the feed container 102.

The feeder system 100 may further be provided with an animal sensor 300 for detecting presence of an animal at the site of the feeder system 100. The animal sensor 300 may be implemented in a number of different ways.

In one embodiment, the animal sensor 300 may comprise a camera or other imaging equipment for acquiring images of a vicinity of the feeder system 100. The animal sensor 300 may then further comprise an image processor for analyzing the images acquired by the camera and determining whether there is an animal present in the image. The image analysis may be configured to detect presence of animals of interest, such that deers or wild boars may be recognized, while squirrels or other smaller animals may not be detected by the animal sensor 300.

The animal sensor 300 may alternatively be arranged to detect the presence of an animal by detecting that an animal pushes or nudges a part of the feeder system 100. Animals may be tempted to nudge the feeder system 100 in a search for feed and may also accidentally bump into the feeder system 100 when eating the feed that has been spread by the feeder system 100.

The animal sensor 300 may thus be arranged to detect that the feeder system 100 is affected by an external force provided by an animal. For instance, the animal sensor 300 may be arranged to detect a vibration in the feeder system 100 caused by the animal nudging the feeder system 100.

Figure 3:
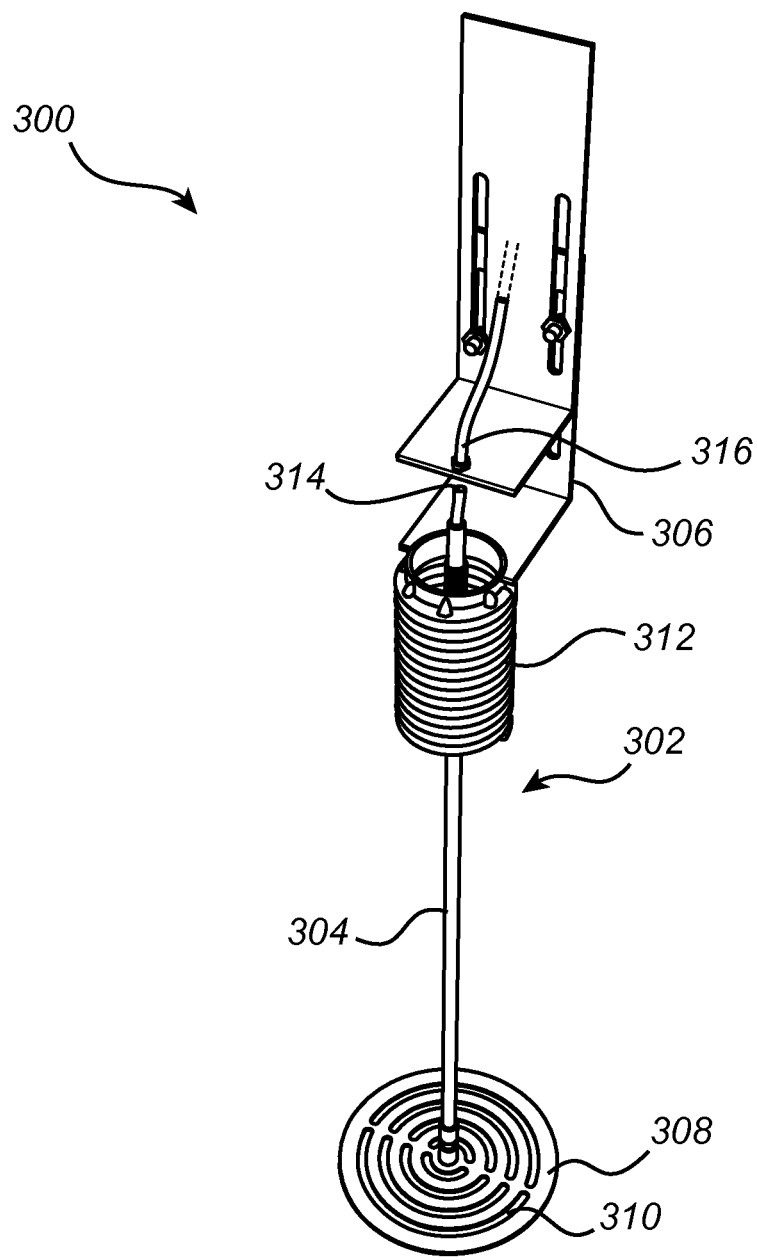
FIG. 3 is a schematic view of an animal sensor according to an embodiment.

A specific embodiment of detecting that the feeder system 100 is affected by an external force is shown in FIG. 3. The animal sensor 300 comprises a movable actuator 302, which is movably mounted to the feeder system 100. The movable actuator 302 may be mounted below a rotatable disc 108 of the spreader 106. This implies that the animal sensor 300 is arranged below the spreader 106 such that part of the feed being output during feed dispersal will fall off the rotatable disc 108 and land on the ground close to the movable actuator 302.

The movable actuator 302 may comprise a rod 304, which is connected to a mount 306 that is fixed to the feeder system 100. The rod 304 may extend from the mount towards the ground. At an end of the rod 304 closest to the ground, the movable actuator 302 may be provided with a blocker 308. The blocker 308 has dimensions and is to be mounted so close to the ground so as to prevent an animal to access feed beneath the blocker 308. For instance, the blocker 308 may have the shape of a disc with a central part of the disc attached to the rod 304.

The blocker 308 may have openings 310 allowing feed that falls onto the blocker 308 from the spreader 106 to further fall through the blocker 308 onto the ground. Thus, the openings 310 should be sufficiently large to allow feed to pass through the openings 310. However, the openings 310 should not be so large that animals may access feed below the blocker 308 through the openings 310. In an embodiment, the blocker 308 may comprise a plurality of relatively narrow openings 310 having an angular extension around the rod 304. These openings 310 may be arranged at different radial distances from the rod 304.

The rod 304 may be attached to a spring 312 that is in turn attached to the mount 306. The spring 312 may force the rod 304 towards a block position, in which the blocker 306 is arranged to block feed on the ground beneath the blocker 306. The spring 312 may further be bent to allow movement of the movable actuator 302, while maintaining a fixed attachment point to the mount 306. This implies that an external force applied to the movable actuator 302 may allow the actuator 302 to be moved and that the actuator 302 may endure being exerted to external forces without breaking or being damaged.

The spring 312 may provide a bias forcing the movable actuator 302 towards a block position. Thus, when an external force on the movable actuator 302 is released the movable actuator 302 may be brought back to the block position by the spring 312. The spring 312 may have a stiffness such that a considerable force is required in order to move the movable actuator 302. Thus, the movable actuator 302 may not be moved by a strong wind. However, the movable actuator 302 is movable by an animal, such as a wild boar or a deer nudging or pushing the movable actuator 302.

The rod 304 may have a free end 314 extending above the attachment of the rod 304 to the spring 312. This implies that when the movable actuator 302 is moved, the free end 314 is moved as well. The animal sensor 300 may further comprise a sensor 316, which is arranged to detect whether the free end 314 is moved. The sensor 316 may be attached to the mount 306 and may be arranged in a position close to a position of the free end 314 in the block position of the movable actuator 302.

The sensor 316 may be implemented in a number of different ways. The sensor 316 may detect that the rod 304 affects an electromagnetic or a vibrational wave, such as detecting that the rod 304 blocks or reflects the wave. For instance, the sensor 316 may detect that the rod 304 blocks emitted light from reaching a photodiode, or the sensor 316 may detect that a frequency of a reflected ultrasonic wave is shifted due to movement of the rod 304. Alternatively, a capacitive or inductive sensor 316 may be used, wherein the sensor 316 may be arranged to detect proximity of the rod 304 in the block position by the rod 304 providing a capacitive or inductive coupling to the sensor 316. The sensor 316 may thus detect presence of an animal by the rod 304 being moved away from proximity of the sensor 316. As a further alternative, the rod 304 may make contact with a mechanical switch such that an electrical circuit is opened or closed when the rod 304 is moved.

According to an alternative embodiment, the animal sensor 300 comprises a residue compartment, which is arranged to receive a part of the feed being spread by the spreader 106. The residue compartment may thus be arranged below the rotatable disc 108 having an input opening that is larger than the size of the rotatable disc 108. Thus, when feed is being dispersed by the spreader 106, some feed will into the residue compartment towards an output opening of the residue compartment.

The output opening may be blocked by a plug, in the form of a ball that is freely suspended in the residue compartment. The ball may thus be forced by gravity towards the output opening. The ball may have dimensions larger than the output opening, such that the ball will block the output opening.

Thanks to the residue compartment receiving a part of the feed output from the feed container, animals will be tempted to nudge or push the residue compartment moving the ball 310 away from the output opening allowing a small amount of feed to be output from the residue compartment.

The animal sensor 300 may further comprise a plug sensor, which is arranged to detect movement of the plug such that presence of an animal may be detected by detecting that an animal nudges the residue compartment to move the ball away from the output opening.

Figure 4A:
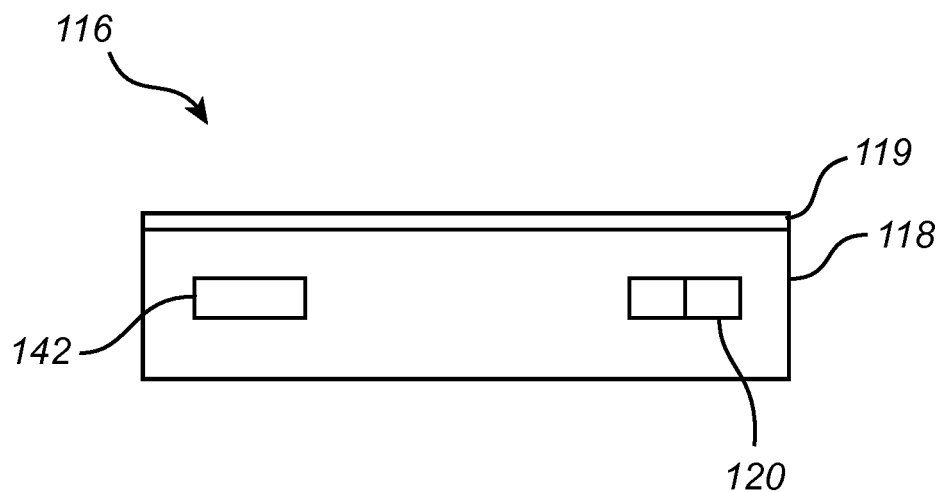
FIG. 4*a* is a side view of a control unit according to an embodiment of the invention.

Referring now to FIG. 4a showing a side view of the control unit 116, the control unit 116 will be further described. The control unit 116 may comprise a self-contained box 118 providing the control unit 116 as a single unit, which may easily be mounted in a feeder system 100. The self-contained box 118 may also comprise an attachment portion for allowing the control unit 116 to be mounted in the feeder system 100. The attachment portion may for instance be in the form of a flange extending from a side of the box 118, wherein the flange may be provided with pre-drilled bores for receiving a screw or nail for attaching the box 118 to a part of the feeder system 100. The control unit 116 being formed as a self-contained box 118 facilitates mounting of the control unit 116 to feeder systems 100 that are already in use and placed out in the nature. For such feeder systems 100, the mounting of a new control unit 116 should be possible to make on site and by the owner of the feeder system 100 without requiring much effort.

The self-contained box 118 of the control unit 116 may comprise a lid 119 that may be screwed on and off in order to allow the control unit 116 to be connected to the battery 114 and the drive unit 110. In one embodiment, these are the only connections that may be necessary for installing the control unit 116 in the feeder system 100. Alternatively, cables may be pre-mounted on the control unit 116, whereby the cables are instead connected to the battery 114 and the drive unit 110, respectively.

Figure 4B:
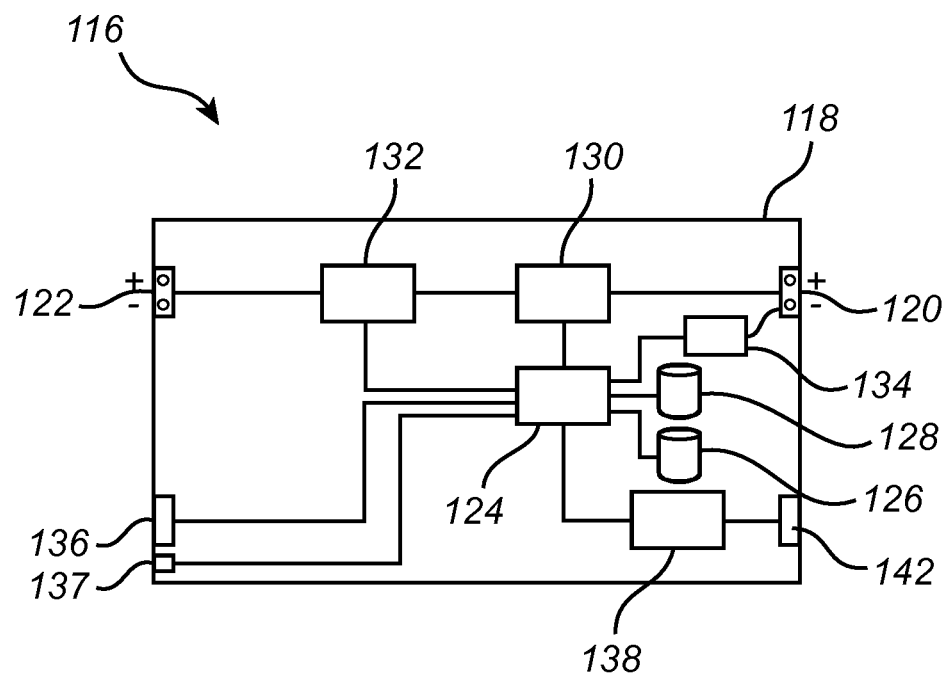
FIG. 4*b* is a schematic view of the control unit of FIG. 4*a*.

Reference is now made to FIG. 4b, which schematically illustrates the parts of the control unit 116. The control unit 116 may comprise an inlet 120 for receiving cables from a battery 114 and an outlet 122 for cables connecting the control unit 116 to the drive unit 110. The inlet 120 and outlet 122 may be formed as receivers for receiving a cable end and a fixating means for fixating the cable end in the receiver. For instance, the cable end may be fixated by a screw in the receiver. Hence, the connection of the control unit 116 to the battery 114 and the drive unit 110 may be easily performed. The inlet 120 and the outlet 122 respectively comprises two receivers for receiving two cable ends for connecting the control unit 116 to positive and negative sides of the electric circuit.

The control unit 116 may comprise a processor 124 for controlling the functionality of the control unit 116. The processor 124 may be connected to a working memory 126 and a non-volatile memory 128. The non-volatile memory 128 may be used as a long-term storage, which may store all programs that the processor 124 may need to run and may store any parameter values or other data that may be needed by a program during execution of the program. When the processor 124 is to run a program, it may be loaded with any necessary parameter values into the working memory 126 providing fast access of the processor 124 to the program instructions that may be needed.

The working memory 126 may e.g. be a cache memory of the processor 124 or any type of Random Access Memory (RAM), such as a static RAM (SRAM), a dynamic RAM (DRAM) or phase-change memory (PRAM). The non-volatile memory 128 may be an electrically addressed system, such as a read-only memory, e.g. an erasable programmable read only memory (EPROM), or a mechanically addressed system, such as a hard disk.

The processor 124 may be any type of suitable processing device, which may be specifically adapted to the functionality of the control unit 116, such as an application-specific integrated circuit (ASIC), or a processing device, which is programmable to achieve the desired functionality of the control unit 116, such as a microprocessor, or a field-programmable gate array (FPGA).

The processor 124 may comprise an internal clock. The processor 124 may further be provided with scheduling data, which may be used for controlling the timing of actions of the feeder system 100. By means of the internal clock, the processor 124 may determine when a specific time provided in the scheduling data occurs and the processor 124 may trigger such actions by providing an appropriate signal.

The control unit 116 may further comprise a relay 130 for selectively connecting the outlet 120 to the power received from the battery 114 via the inlet 120. The relay 130 may receive a signal from the processor 124, which may drive the relay 130 to switch the connection between the inlet 120 and the outlet 122 on or off. Using the scheduling data, the processor 124 may actuate the relay 130 at certain points of time. The relay 130 may then turn on power to the drive unit 110 via the outlet 122, whereby the drive unit 110 actuates the spreader 108 so as to provide dispersal of feed from the feeder system 100. Hence, the control unit 116 may control at what points of time feed is dispersed.

The control unit 116 may thus provide a means for controlling the powering of the drive unit 110 in the form of a controller circuitry that selectively connects the battery 114 to the drive unit 110.

The control unit 116 may further acquire information about the function of the feeder system 100. Such acquired information may relate to measurements of parameters of the feeder system 100 indicating how the feeder system 100 functions. In this regard, the control unit 116 may comprise a power sensor 132 for measuring the power consumption of the drive unit.

The power sensor 132 may be arranged to measure a property of the circuit connecting the battery 114 to the drive unit 110. The power sensor 132 may thus comprise a component electrically connected between the inlet 118 and the outlet 120 of the control unit 116 in order to enable measuring the power consumption. The power sensor 132 may measure a voltage over the component, a current passing through the component, or electric power consumed by the component, or any other parameter providing a measure of the power consumption in the circuit, as would be understood by a person skilled in the art.

The power sensor 132 may alternatively be arranged to indirectly measure the power consumption. This may e.g. be achieved by means of a Hall sensor that detects a magnetic field created by the current running through a wire of the circuit.

The power sensor 132 may be connected to the processor 124 for providing a measure of the power consumption to the processor 124. The processor 124 may be provided with a desired value of the measure, which may relate to the power consumption during normal functioning of the feeder system 100. The processor 124 may also be provided with a threshold value providing an allowed deviation from the desired value. There may be a lower threshold value indicating a lowest allowed power consumption and a higher threshold value indicating a highest allowed power consumption. The desired value and the threshold values may be stored in the non-volatile memory 128 of the control unit 116.

The lower and higher threshold values may relate to power consumptions for predetermined conditions that correspond to an operational disturbance of the feeder system 100.

If the feed container 102 is empty, or if feed is jammed in the feed outlet 104 so that no feed is being provided onto the spreader 106, the drive unit 110 drives the spreader 106 in an unloaded condition causing the power consumption to be lowered. Hence, the lower threshold value may be set above the power consumption for driving an empty spreader 106, so that such a condition may be detected.

On the other hand, if the spreader 106 is jammed or not running smoothly, the feed may not be spread as far around the feeder system 100 as desired. Also, the drive unit 110 will need more power to actuate the spreader 106. The higher threshold value may thus be set below the power consumption for driving a jammed spreader 106, so that such a condition may be detected.

The processor 124 may thus compare the measured value received from the power sensor 132 to the lower and higher threshold values in order to determine whether the measured parameter value provided by the power sensor 132 fulfills a predetermined condition indicating an operational disturbance of the feeder system 100. The predetermined condition may thus be a deviation from the desired value of the measured parameter that is larger than the allowed deviation.

In this way, the processor 124 provides a comparing device as a means for determining whether a measured parameter value provided by a sensor fulfills a predetermined condition.

The control unit 116 may further comprise a motor-protective circuit breaker for cutting power to the drive unit 110 in order to prevent excessive load on the drive unit 110. The circuit breaker may be a separate component or may be integrated in the relay 130 or the power sensor 132. The circuit breaker may be arranged to detect if a load on the drive unit 110 exceeds a threshold wherein damage to the drive unit 110 may occur. Upon detecting such an excessive load on the drive unit 110, the circuit breaker may immediately cut power to the drive unit 110 in order to protect the drive unit 110 from being damaged by the excessive load.

The circuit breaker ensures that power to the drive unit 110 is immediately cut, so that the possibly damaging condition may be prevented. However, the detection of the excessive load may also correspond to determining that a predetermined condition, i.e. a load exceeding the set threshold, is fulfilled indicating an operational disturbance of the feeder system 100. Hence, as described further below, the control unit 116 may also provide information that a predetermined condition has been fulfilled when an excessive load is detected.

The control unit 116 may also comprise a battery tester 134 for measuring the capacity of the battery 114. The battery tester 134 may provide a measured value of a property of the battery 114 relating to the battery capacity. For example, the battery tester 134 may provide a measured value of the voltage level on the battery 114. The battery tester 134 may be arranged to be selectively connected to the inlet 118 for measuring the capacity of the battery 114. The battery tester 134 may drain some energy from the battery 114 during testing. Therefore, selectively connecting the battery tester 134 to the battery 114 implies that the battery tester 134 only consumes battery energy when tests are needed.

The battery tester 134 may be connected to the processor 124 for providing a measure of the battery capacity to the processor 124. The processor 124 may be provided with a desired value of the measure of battery capacity. The processor 124 may also be provided with a threshold value providing an allowed deviation from the desired value. The desired value and the threshold values may be stored in the non-volatile memory 128 of the control unit 116. If the measured value is below the threshold value, the battery capacity is becoming low and the battery 114 may need to be replaced or recharged.

The processor 124 may thus compare the measured value received from the battery tester 134 to the lower threshold values in order to determine whether the measured parameter value provided by the battery tester 134 fulfills a predetermined condition indicating an operational disturbance of the feeder system 100, namely that the battery 114 may need replacement or recharging.

The control unit 116 may also comprise an inlet 136 for receiving a signal from a feed level sensor (not shown). The feed level sensor may provide a measure of the feed level in the feed container 102 by measuring a property relating to the feed level, such as weight or pressure provided on the sensor by the feed. In one embodiment, the feed level sensor may simply detect presence or absence of feed at a particular level in the feed container 102. Hence, if there is no feed at this level, the feed level sensor may provide an indication that the feed container 102 is close to empty.

The control unit 116 may thus through the inlet 136 receive a signal which provides a measure of the feed level in the feed container 102. This signal may be provided to the processor 124, which may determine whether the measure of the feed level sensor fulfills a predetermined condition indicating an operational disturbance of the feeder system 100, namely that the feed container 102 is becoming empty.

The use of a feed level sensor may be optional, since it may require installation of a feed level sensor on the feeder system 100. If the control unit 116 is to be installed on a feeder system 100 in present use, the feeder system 100 may not be adapted to allow a feed level sensor to be installed. The user may thus choose to not connect any feed level sensor to the inlet 136. When the control unit 116 has no unit connected to the inlet 136, any function to detect a low feed level may be disabled.

The control unit 116 may further comprise an inlet for receiving a signal from an animal sensor 300. The animal sensor 300 may thus provide a signal each time the animal sensor 300 detects the presence of an animal. The signal from the animal sensor 300 may be provided to the processor 124. The processor 124 may time-stamp the detection of an animal and the detection of the presence of an animal may be stored in a log in the non-volatile memory 128.

The feeder system 100 may further be provided with a lamp (not shown) for illuminating a site of the feeder system 100. The control unit 116 may thus further comprise an outlet 137 for controlling turning on and off of the lamp. The illumination of the site of the feeder system 100 may for instance be started in relation to output of feed from the feeder system 100 and the site may be illuminated during a time period after feed has been output. Thus, the illumination of the site may act as a signal to animals that feed has been output and animals may learn to associate an illuminated site with the possibility to find feed at the site.

The control unit 116 may further comprise a communication unit 138 for enabling communication between the control unit 116 and a remote unit 140 (see FIG. 1). The communication unit 138 may be connected to an antenna outlet 142 of the control unit 116. An antenna 144 may be connected to the antenna outlet 142 and may be arranged in relation to the feeder system 100 in order to improve strength of signals to and from the communication unit. The antenna 144 may be fixed to an outer part of the weatherproof case and positioned at the top of the feeder system 100 in order for signals not to be disturbed by the other parts of the feeder system 100. However, the control unit 116 may comprise an internal antenna in order not to require any further installation action when mounting the control unit 116 on the feeder system 100. An external antenna 144 may thus work as an amplifier of the internal antenna of the control unit 116.

The communication unit 138 may be arranged as a transmitter, which comprises a dedicated circuit for converting information to be transmitted to an appropriate protocol and a signal for wireless transmission over a wireless network 146 via the antenna 144. However, in an embodiment, the communication unit 138 may be arranged as a transceiver, which further comprises a dedicated circuit for converting a received signal and extracting information from the received signal. The communication unit 138 may be constituted by a chipset specifically prepared for wireless communication, which is available from a number of vendors.

The communication unit 138 may be arranged for wireless communication through a mobile network, such as GSM, UMTS, LTE, GPRS, or EDGE. However, it may be contemplated that the communication unit 138 is arranged for wireless communication with a router unit in close relation to the feeder system 100, which router unit may in turn connect the communication unit 138 to the remote unit 140, possibly via a wireless network. Such communication with the router unit may for instance be by a short-range wireless communication, such as Bluetooth® or any other communication over a wireless local area network.

The communication unit 138 need not comprise a dedicated circuit for converting information to/from signals for wireless communication, but may instead be a general-purpose processor being loaded with processing instructions for performing the functions of the communication unit 138. For instance, the processor 124 may run a process for accomplishing the functionality of a communication unit 138.

The control unit 116 may further comprise a positioning sensor (not shown) for determining the position of the feeder system 100. The feeder system 100 is arranged to be placed in nature without being supervised. Hence, there may be a risk of the feeder system 100 being stolen. The processor 124 may store a set position of the feeder system 100. By using a signal from the positioning sensor, the processor 124 may compare a measured value of the position to the set position in order to detect a deviation from the set position. Hence, the processor 124 may detect that a predetermined condition indicating that the feeder system 100 is being stolen or otherwise moved is fulfilled.

The position of the feeder system 100 may also be determined using the origin of signals from the communication unit 138 to a wireless network 146. The wireless network 146 may comprise base stations, which may compare signal strengths of the communication unit 138 in order to determine a location, from which the signal is transmitted. Alternatively, the communication unit 138 may determine its position based on signal strength of signals received from base stations. The measured value of the position may be provided to the processor 124 for determining whether the measured value deviates from the set position.

When the processor 124 finds that a predetermined condition is fulfilled, an action-requiring state of the feeder system 100 is detected. The processor 124 may, in response to the detected action-requiring state, create a notification. The processor 124 may then transmit the notification to the communication unit 138, which in turn may form a signal for transmitting the notification to the remote unit 140.

As described above, the control unit 116 may provide notifications to a user at the remote unit 140, whenever an operational disturbance is detected at the feeder system 100. The user may in this way receive warnings that the feeder system 100 is in an action-requiring state and that there may be a need for the user to take an action.

This implies that a user is provided with clear indications when actions are required. There is no need for the user to analyze data in order to determine whether an operational disturbance has occurred in the feeder system 100. Further, the feeder system 100 may be located at a remote site, which may not be easily accessible to the user. Therefore, it is advantageous for the user only to need to travel to the site of the feeder system 100, when actually necessary.

The remote unit 140 may be any type of computer device or a mobile phone, which may run an application handling control of the feeder system 100. The notification may be sent as a push notice to the application, which enables the user to immediately see the notification of the action-requiring state in the application. The notification may also be sent as an electronic mail or a text message, such as a Short Message Service (SMS) message, to the remote unit 140.

In an embodiment, the communication unit 138 is arranged to communicate with a communication module 150 of a central control system 148. The central control system 148 may provide rules for controlling dispersal of feed from the feeder system 100.

The central control system 148 may be implemented as software or hardware or a combination thereof. In one embodiment, the central control system 148 may comprise a computer software, which is executed on a processing unit, such as a general-purpose processor, for providing control of dispersal of feed to control unit 116. In another embodiment, the central control system 148 may be implemented in specially-adapted hardware, such as ASIC or FPGA for providing the desired functionality.

The central control system 148 may communicate with a plurality of control units 116 and may thus act as a hub for controlling the dispersal of feed from a plurality of control units 116. The central control system 148 may further comprise an interface 152 for allowing a user at a remote unit 140 to interact with the central control system 148. The user may thus provide input to the central control system 148 to control a functionality of the user's control units 116 through the central control system 148.

The central control system 148 may comprise a memory 154 storing a set of rules for controlling dispersal of feed. The set of rules may provide typical schemes for dispersal of feed. The schemes may, for instance, define number of times per day that dispersal is to be actuated, default times for dispersal of feed, amount of feed to be dispersed at the times of dispersal. The user may further provide input of control unit specific parameters through the interface 152. These control unit specific parameters may be stored in the memory 154 in association with an identifier of the control unit 116 that the parameters are to be applied to.

The control unit specific parameters may thus adapt a typical scheme for dispersal of feed to the specific desired dispersal of feed to be instituted by the specific control unit 116. For instance, the control unit specific parameters may define which of the typical schemes, defined by the set of rules, that is to be applied to the control unit 116 and may further shift the default times for dispersal of feed as provided by the typical scheme.

The set of rules for controlling dispersal of feed may further selectively activate control features depending on whether relevant input is available. For instance, a user may provide control unit specific parameters to indicate whether an animal sensor 300 and/or a feed sensor is installed at the feeder system 100. Alternatively, the control unit 116 may automatically determine whether such sensors are connected to the control unit 116 and transmit information whether such sensors are installed to the central control system 148. If a sensor is not installed, control features relating to input from such sensors may be disabled. The animal sensor 300 may be related to a presence feature, which may be activated if an animal sensor 300 is used.

The central control system 148 may further comprise an astronomy module. The astronomy module may access a database comprising information of sunrise and sunset times in relation to earth locations. The database may be internally stored in the memory 154 or may be external to the central control system 148.

The astronomy module may further receive information of a position of the feeder system 100 determined by the positioning sensor. Alternatively, a user may indicate a position of the feeder system 100 on a map, which may be presented for providing input through the interface 152.

The astronomy module may thus be configured to determine the sunrise and sunset times applying to the specific control unit 116 by look-up in the database in relation to the position of the feeder system 100. The central control system 148 may then store the sunrise and sunset times applying to the specific control unit 116 in the memory 154.

Information of the sunrise and sunset times applying to the control unit 116 may form an astronomy feature that may be selectively activated in the rules for controlling dispersal of feed. If a user activates the astronomy feature, parameters for defining the times for dispersal of feed may be related to sunrise and sunset times. The user may for instance define that dispersal of feed is to be actuated 30 minutes before sunrise and 30 minutes after sunset. Thus, although the sunrise and sunset times may vary considerably between seasons, the dispersal of feed may be related to sunrise and sunset without a need to define individual times for feed dispersal for each day of the year.

The control unit 116 may be arranged to periodically transmit information to the central control system 148, according to a schedule in the control unit 116 or upon request from the central control system 148. This periodic transmittal of information may occur independently of any notifications of action-acquiring state being transmitted.

The control unit 116 may provide input comprising information of performed dispersal of feed, such as information of duration of activation of the drive unit 110 for dispersal of feed, information of power consumption during the dispersal of feed, and information of a time and date at which the dispersal of feed was actuated. Further, the control unit 116 may provide input regarding any detections of animals present at the site of the feeder system 100 and the times of such detections.

The central control system 148 may further comprise a feed dispersal computing module 156. The feed dispersal computing module 156 may access the set of rules for controlling dispersal of feed, the control unit specific parameters, sunrise and sunset times at the position of the feeder system 100 if such are available, and input from the control unit 116.

The feed dispersal computing module 156 is arranged to determine feed dispersal instructions. The feed dispersal instructions may form scheduling data for the control unit 116, which may be transmitted to the control unit 116 for controlling the dispersal of feed at the feeder system 100.

The feed dispersal instructions may also form instructions for controlling a single time or a few times of dispersal of feed at the feeder system 100. For instance, the feed dispersal instructions may be an instruction to skip the next dispersal of feed.

If the presence feature is activated, the feed dispersal computing module 156 may determine whether there has been any animal activity at the feeder system 100 since the last time of dispersal of feed. If no, or low, activity has been registered, the feed dispersal computing module 156 may determine that the next dispersal of feed should be skipped and may provide feed dispersal instructions accordingly.

The control unit 116 may be arranged to communicate with the central control system 148 before each scheduled dispersal of feed. This may be used to update feed dispersal instructions, regardless whether a last dispersal of feed was skipped. Hence, if a dispersal of feed has been skipped and there has still been no, or low, activity registered since the last dispersal of feed, the next dispersal of feed may also be skipped and corresponding feed dispersal instructions may be provided. However, the rules for controlling dispersal of feed may stipulate a maximum number of sequential skipped dispersals of feed. For instance, if no dispersal of feed has been made for seven days and no animal activity has been registered, a dispersal of feed may be performed anyway to hopefully tempt animals to start frequenting the location of the feeder system 100 again.

The feed dispersal computing module 156 may determine that no update is needed to the scheduling data of the control unit 116. If so, it may not be necessary to send any feed dispersal instructions to the control unit 116. Alternatively, a feed dispersal instruction defining that dispersal of feed should be maintained according to the present scheduling data may be transmitted.

If a user wants to update the scheduling data or change the way feed dispersal instructions are determined, the user may update the control unit specific parameters. Then, the central control system 148 may provide accordingly updated scheduling data to the control unit 116 the next time communication with the control unit 116 occurs.

The remote unit 140 may run an application that is adapted for communication with the central control system 148 and may present an interface to the user for interacting with the central control system 148.

In an embodiment, the communication unit 138 of the control unit 116 may transmit notifications of an action-acquiring state to the central control system 148. The central control system 148 may or may not adapt the information to a format desired by the user before the notification is forwarded to the user.

The central control system 148 may store a log of notifications having been sent from the control unit 116, scheduling data for the control unit 116, and other settings. The user may connect to the central control system 148 through the interface 152 for adapting personal settings in order to e.g. control how notifications are sent by the control unit 116. For example, the user may change which remote unit 140 that is to receive the notifications. Also, the feeder system 100 may be protected against theft by means of the control unit 116 being tied in the central control system 148 to a specific user, whereby the control unit 116 is not possible to access for anyone else. This may be achieved by the user connecting the serial number of the feeder system 100 to his user account on the central control system 148. Further, a user may control several feeder systems 100 and may tie all the feeder systems 100 to the same user account.

The user may also send information from the remote unit 140, possibly via the central control system 148, to the control unit 116 in order to remotely control functionalities of the feeder system 100. For instance, the user may demand a test of the feeder system 100 to be performed when an action-requiring state has been detected. Thereby, the user may determine whether the operational disturbance is continuous or whether a temporary problem occurred. A test of the feeder system 100 may include demanding dispersal of feed and detecting the power consumption of the drive unit 110. Also, the test may include detecting the battery capacity of the battery 114.

Further, the user may send information from the remote unit 140 in order to control the timing of actuating the relay 130 for turning on the drive unit 110, so as to control when feed is dispersed. The user may send an instruction to perform an instantaneous dispersal of feed, running the drive unit 110 for a certain period of time. Also, the user may send information to update the scheduling data, so as to alter the points of time during a day that feed is dispersed.

Further, the central control system 148 and the control unit 116 may be set up in a master/slave configuration, with the control unit 116 working as a slave to the central control system 148. In particular, the control unit 116 may only comprise a volatile memory 126. The central control system 148 may thus store all parameter values of the control unit 116 so that these may be provided to the control unit 116 upon start of the control unit 116, e.g. if the control unit 116 temporarily lost power.

The control unit 116 may be mounted on the feeder system 100 during manufacture of the feeder system 100. In such case, the power consumption of the drive unit 110 may be tested during manufacture for determining appropriate threshold values that indicate an operational disturbance of the feeder system 100. Each individual feeder system 100 manufactured may be tested and calibrated in this manner. Alternatively, default values for the type of feeder system 100 may be used.

When the control unit 116 is provided as a separate unit and not installed on the feeder system 100 during manufacture, some calibration may be needed in installation. During calibration, conditions corresponding to operational disturbances may be forced on the feeder system 100, and parameter values may be determined for such conditions. In particular, the measured power consumption may need calibration, and the power consumption may be measured for an empty feed container 102 and for a situation where increased resistance is provided on the spreader 106, simulating a jammed spreader 106.

Alternatively, the parameters may be measured during normal conditions, when the feeder system 100 is functioning properly. Based on these measurements, the desired values of the measured parameters may be determined. Then, the threshold values may be pre-set as a specific percentage of the desired values.

As a further alternative, the control unit 116 may be pre-tested on a number of different models of feeder systems 100 for calibrating the control unit 116 to these models. The control unit 116 may be provided with desired values and/or threshold values for measured parameters for the different models of the feeder systems 100. Then, when the control unit 116 is to be installed on a feeder system 100, the model of the feeder system 100 may be specified to the control unit 116 in order to set up the control unit 116 to use the appropriate desired values and/or threshold values. Hence, there is no need for a user installing the control unit 116 on the feeder system 100 to perform a calibration.

The control unit 116 may be compatible with any model of feeder systems 100 using a battery 114 for driving a drive unit 110 to disperse feed. The control unit 116 may thus be installed on any feeder system 100 that is already in use, in order to improve the functionality of the feeder system 100 and allow a user to remotely receive information of any operational disturbances of the feeder system 100. By the control unit 116 also being pre-calibrated to a number of models of feeder systems 100, use of the control unit 116 on any feeder system 100 is further facilitated. Upon installation of the control unit 116, the threshold for the motor-protective circuit breaker may also be set in accordance with the model of the feeder system 100.

The power consumption of a number of existing models of game feeders have been tested for both normal conditions and when the spreader 106 is driven without any feed and when the spreader 106 is jammed. It was found that the power consumption was only marginally affected by the type of feed (corn, wheat, or barley). The power consumption was measured for spreaders of models PE 360 and PE light, delivered by Pfeiff's Feeder AB of Sweden, and a spreader, article number 48-826 delivered by Biltema Nordic Services AB of Sweden. The PE 360 model was tested with a motor from DOGA S.A. of Spain type 162.4101.20.00 and a motor from Changzhou Fulling Motor Co., Ltd of China type 63ZY125-1230. All models were driven by a 12 V battery. The results of the tests are shown in Table 1.

TABLE 1

Power consumption as measured current for different models of feeders in different conditions

| Model | Measured current in normal conditions (A) | Measured current when no load (A) | Deviation from normal condition | Measured current when spreader jammed (A) | Deviation from normal condition |
|---|---|---|---|---|---|
| PE 360, DOGA | 18 | 6 | 67% | 28 | 56% |
| PE 360, Fulling | 20 | 6 | 70% | 38 | 90% |
| PE light | 9 | 4 | 56% | 14 | 56% |
| Biltema | 10 | 4 | 60% | 14 | 40% |

As can be seen from the results, there is a significant difference between the normal conditions and when an operational disturbance occurs. Hence, it would be possible to define a deviation from the normal power consumption that corresponds to an operational disturbance. The control unit 116 may thus detect an action-requiring state when such truly occurs and normal variations of the power consumption would not cause an action-requiring state to be detected.

For instance, the deviation from the predetermined power consumption may be set to be larger than 30% or lower than 40% of the predetermined power consumption. This would correspond to setting a higher threshold value that is 130% of the measured normal power consumption and setting a lower threshold value that is 60% of the measured power consumption.

Figure 5:
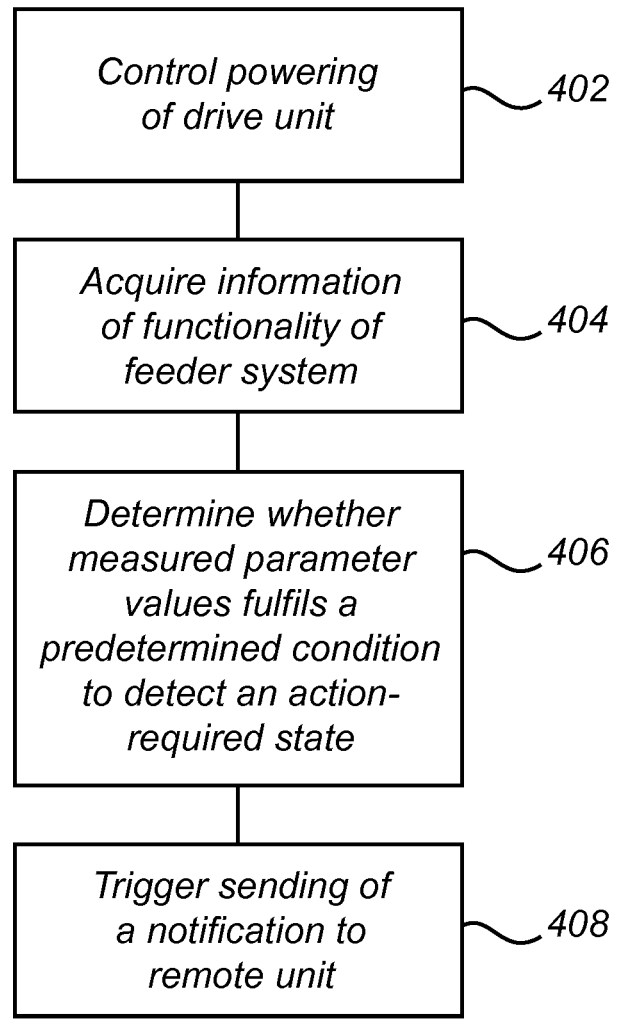
FIG. 5 is a flow chart illustrating a method according to an embodiment of the invention.

Referring now to FIG. 5, a method in a control unit 116 will be described. The control unit 116 controls, step 402, the powering of the drive unit 110 by selectively connecting the battery 114 to the drive unit 110. The control unit 116 may thus control the timing of when feed is dispersed from the feeder system 100.

Further, information of a functionality of the feeder 100 is acquired, step 404, by means of sensors. The information may be acquired in the form of measured values of parameters of the feeder system 100. The control unit 116 may comprise a power sensor for measuring the power consumption of the drive unit 110, in order to detect any operational disturbances of the feeder system. Also, a battery capacity, a feed level in the feed container 102, and a position of the feeder system 100 may be determined.

The measured parameter values may then be analyzed to determine, step 406, whether the measured parameter value fulfils a predetermined condition in order to detect an action-requiring state of the feeder system 100. The measured parameter values may be compared by the processor 124 to threshold values stored in a memory 128 defining deviations from a desired value of the parameter. If the processor 124 detects that the measured parameter value deviates from the desired value beyond the threshold value, the processor 124 may thus determine that the predetermined condition is fulfilled. In particular, the processor 124 may detect that the power consumption of the drive unit 110 is too low or too high indicating an operational disturbance.

When an action-requiring state is detected, the processor 124 may trigger, step 408, sending of a notification to a remote unit 140. Hence, the control unit 116 may provide a user at a remote unit 140 with information that an action is required. For instance, if the drive unit 110 is jammed, the user may receive a notification that the power consumption is too high, allowing the user to travel to the site of the feeder system 100 for repairing the feeder system 100.

The person skilled in the art realizes that the present invention by no means is limited to the preferred embodiments described above. On the contrary, many modifications and variations are possible within the scope of the appended claims. For example, it should be realized that although the control unit 116 has been described above as having a processor 124 controlling the functionality of the control unit 116, other implementations are conceivable, even without the processor 124. For instance, the measured values from the sensors, such as the battery tester 134 and the power sensor 132, may be compared to threshold values in a specifically adapted electric circuit forming a comparing device for comparing two or more values. The circuit may then output a signal whenever the predetermined condition is detected. Hence, the means for determining a deviation may be formed as a specific circuit comparing measured values to pre-set threshold values. The comparison circuit may output the signal to the communication unit 138 in order to trigger sending of a notification. The communication unit 138 may also be able to perform some processing of the signal in order to produce an appropriate notification. In this embodiment, the control unit 116 may also comprise a timer circuit for controlling when the drive unit 114 is powered and when the sensors are used for measuring parameter values.

The invention claimed is:

1. A control unit for a game or fish feeder comprising a spreader, wherein the control unit is arranged for mounting on or in connection to the feeder, said control unit comprising:

a controller circuitry controlling the powering of a drive unit of said feeder for controlled output of feed from the feeder;

a wireless transmitter arranged to communicate over a wireless network with a remote unit;

a sensor for measuring a parameter of the feeder; and a processor determining whether a measured parameter value provided by said sensor fulfills a predetermined condition in order to detect an action-requiring state of the feeder, wherein, in response to a detected action-requiring state, the wireless transmitter is triggered to send a notification to said remote unit;

wherein the control unit is formed as a self-contained box, and wherein the self-contained box comprises an input for connection to a battery, and an output for connection to said drive unit of the feeder such that the control unit controllably provides power from said battery to said drive unit;

wherein said sensor comprises a power sensor for measuring the power consumption of said drive unit, and wherein said predetermined condition is a deviation from a predetermined desired value of the power consumption relating to the power consumption during normal functioning of the feeder, wherein a lower threshold value indicates a lowest allowed power consumption and a higher threshold value indicates a highest allowed power consumption, the lower and higher threshold values being related to power consumptions for predetermined conditions that correspond to operational disturbances, and wherein the lower threshold value is set above a power consumption for driving an empty spreader so that a condition of no feed being provided onto the spreader may be detected.

2. The control unit according to claim 1, wherein said deviation from the predetermined power consumption is larger than 30% or lower than 40% of said predetermined power consumption.

3. The control unit according to claim 1, wherein the wireless transmitter is part of a wireless transceiver for receiving and transmitting information over a wireless network.

4. The control unit according to claim 3, wherein the control unit is arranged to cause said wireless transmitter to periodically communicate with a central control system and receive information for updating scheduling data for controlling output of feed from the feeder.

5. The control unit according to claim 1, further comprising a motor-protective circuit breaker for cutting power to the drive unit in order to prevent excessive load on the drive unit.

6. A game or fish feeder system comprising:
a feed container provided with a feed outlet;
a spreader arranged to receive and spread feed from said feed outlet when said spreader is actuated;
a drive unit connected to the spreader and arranged to actuate the spreader when the drive unit is powered;
a battery arranged to power said drive unit; and
a control unit mounted on the feeder system, comprising:
a controller circuitry controlling the drive unit of feeder system for controlled output of feed from the feeder;
a wireless transmitter arranged to communicate over a wireless network with a remote unit;
a sensor for measuring a parameter of the feeder; and
a processor determining whether a measured parameter value provided by said sensor fulfills a predetermined condition in order to detect an action-requiring state of the feeder,
wherein, in response to a detected action-requiring state, the wireless transmitter is triggered to send a notification to said remote unit;
wherein the control unit is formed as a self-contained box, and wherein the self-contained box comprises an input for connection to a battery, and an output for connection to said drive unit of the feeder such that the control unit controllably provides power from said battery to said drive unit,
wherein said sensor comprises a power sensor for measuring the power consumption of said drive unit, and wherein said predetermined condition is a deviation from a predetermined desired value of the power consumption relating to the power consumption during normal functioning of the feeder; and
wherein a lower threshold value indicates a lowest allowed power consumption and a higher threshold value indicates a highest allowed power consumption, the lower and higher threshold values being related to power consumptions for predetermined conditions that correspond to operational disturbances, and
wherein the lower threshold value is set above a power consumption for driving an empty spreader so that a condition of no feed being provided onto the spreader may be detected.

7. The feeder system according to claim 5, wherein said deviation from the predetermined power consumption is larger than 30% or lower than 40% of said predetermined power consumption.

8. The feeder system according to claim 5, wherein the wireless transmitter is part of a wireless transceiver for receiving and transmitting information over a wireless network.

9. The feeder system according to claim 8, wherein the control unit is arranged to cause said wireless transmitter to periodically communicate with a central control system and receive information for updating scheduling data for controlling output of feed from the feeder.

10. The feeder system according to claim 5, further comprising a motor-protective circuit breaker for cutting power to the drive unit in order to prevent excessive load on the drive unit.

11. A method for detecting an action-requiring state of a game or fish feeder comprising a spreader, wherein the feeder has a control unit mounted on or in connection to the feeder, said method comprising:
forming the control unit as a self-contained box, and wherein the self-contained box comprises an input for connection to a battery, and an output for connection to a drive unit of said feeder such that the control unit controllably provides power from said battery to said drive unit,
by the control unit:
controlling the powering of the drive unit of said feeder for controlled output of feed from the feeder;
measuring a power consumption of said drive unit;
determining whether a value of the measured power consumption fulfils a predetermined condition in order to detect an action-requiring state of the feeder,
wherein said predetermined condition is a deviation from a predetermined desired value of the power consumption relating to the power consumption during normal functioning of the feeder, and
wherein a lower threshold value indicates a lowest allowed power consumption and a higher threshold value indicates a highest allowed power consumption, the lower and higher threshold values being related to power consumptions for predetermined conditions that correspond to operational disturbances, and wherein the lower threshold value is set above a power consumption for driving an empty spreader so that a condition of no feed being provided onto the spreader may be detected; and in response to a detected action-requiring state, sending a notification to a remote unit.

* * * * *